United States Patent
Rawlinson et al.

(10) Patent No.: US 9,397,376 B2
(45) Date of Patent: *Jul. 19, 2016

(54) BATTERY PACK WITH SEGMENTED, ELECTRICALLY ISOLATED HEAT SINK

(71) Applicant: Atieva, Inc., Redwood City, CA (US)

(72) Inventors: Peter Dore Rawlinson, Worcestershire (GB); Richard Biskup, Sunnyvale, CA (US); Benson Tsai, Mountain View, CA (US)

(73) Assignee: ATIEVA, INC., Menlo Park, CA (US)

(*) Notice: Subject to any disclaimer, the term of this patent is extended or adjusted under 35 U.S.C. 154(b) by 86 days.

This patent is subject to a terminal disclaimer.

(21) Appl. No.: 14/497,142

(22) Filed: Sep. 25, 2014

(65) Prior Publication Data

US 2016/0093931 A1 Mar. 31, 2016

Related U.S. Application Data

(63) Continuation-in-part of application No. 14/497,004, filed on Sep. 25, 2014.

(51) Int. Cl.
*H01M 10/625* (2014.01)
*H01M 2/10* (2006.01)
*H01M 2/20* (2006.01)
*H01M 10/651* (2014.01)
*H01M 10/6556* (2014.01)
*H01M 10/653* (2014.01)

(52) U.S. Cl.
CPC .......... *H01M 10/625* (2015.04); *H01M 2/1077* (2013.01); *H01M 2/206* (2013.01); *H01M 10/651* (2015.04); *H01M 10/653* (2015.04); *H01M 10/6556* (2015.04); *H01M 2220/20* (2013.01)

(58) Field of Classification Search
CPC ... H01M 2/202; H01M 2/206; H01M 2/1077; H01M 10/613; H01M 10/643
See application file for complete search history.

(56) References Cited

U.S. PATENT DOCUMENTS

| | | | |
|---|---|---|---|
| 2012/0141852 A1* | 6/2012 | Eberhard | H01M 2/1077 429/98 |
| 2012/0164490 A1* | 6/2012 | Itoi | H01M 2/105 429/7 |
| 2014/0255750 A1 | 9/2014 | Jan | |
| 2015/0135939 A1* | 5/2015 | Rawlinson | F41H 7/042 89/36.08 |

(Continued)

OTHER PUBLICATIONS

U.S. Appl. No. 14/331,300, Biskup et al.

(Continued)

*Primary Examiner* — Nicholas P D'Aniello
(74) *Attorney, Agent, or Firm* — Patent Law Office of David G. Beck (57) ABSTRACT

A battery assembly is provided that utilizes electrically isolated heat sinks to enhance battery pack thermal management and safety. The battery assembly is divided into groups of batteries, where the batteries within each group are of the same voltage, and where each battery group is serially coupled to the other battery groups. The heat sink is segmented, where each heat sink segment is thermally coupled to the batteries within a single battery group, and where each heat sink segment is electrically isolated from the adjacent heat sink segments. The heat sink segments are thermally coupled to, and electrically isolated from, at least one coolant conduit which, in turn, is coupled to a thermal management system.

19 Claims, 9 Drawing Sheets

(56) References Cited

U.S. PATENT DOCUMENTS

2015/0135940 A1* 5/2015 Rawlinson ........ H01M 10/5016 89/36.08
2016/0020497 A1* 1/2016 Biskup ................ H01M 10/625 429/120

OTHER PUBLICATIONS

U.S. Appl. No. 14/083,476, P.D. Rawlinson.
U.S. Appl. No. 14/132,179, P.D. Rawlinson.

* cited by examiner

FIG. 17

BATTERY PACK WITH SEGMENTED, ELECTRICALLY ISOLATED HEAT SINK

CROSS-REFERENCE TO RELATED APPLICATION

This application is a continuation-in-part of U.S. patent application Ser. No. 14/497,004, filed 25 Sep. 2014, the disclosure of which is incorporated herein by reference for any and all purposes.

FIELD OF THE INVENTION

The present invention relates generally to batteries and battery packs and, more particularly, to a system that improves battery pack safety.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, safety and cost.

In recent years there have been several incidents of a rechargeable battery pack, contained within a laptop computer or utilized in a vehicle, catching on fire. As a result, one of the primary issues impacting consumer confidence with respect to both hybrid and all-electric vehicles is the risk of a battery pack fire.

Rechargeable batteries tend to be relatively unstable and prone to thermal runaway, an event that occurs when a battery's internal reaction rate increases to such an extent that it is generating more heat than can be withdrawn. Thermal runaway may be the result of a battery short, a manufacturing defect, improper cell use, or damage such as that which may be sustained during an accident or when road debris dents or punctures the battery pack. If the reaction rate and the generation of heat go unabated during the thermal runaway event, eventually the generated heat becomes great enough to cause the battery and materials in proximity to the battery to combust. Therefore when the battery undergoing thermal runaway is located within a battery pack containing tens or hundreds of batteries, a single event can quickly propagate throughout the pack, dramatically increasing the likelihood of property damage as well as the risk to people in close proximity to the vehicle.

Vehicle manufacturers have employed a variety of techniques to both minimize the risk of a battery undergoing thermal runaway and control the propagation of the event if one should occur. These techniques include ballistic shields to prevent battery pack damage from road debris, monitors that detect battery malfunctions, monitors that detect the onset of a thermal runaway event, and advanced thermal management and fire control systems that help to limit event propagation. While these techniques may reduce the likelihood of a thermal runaway event and limit its effects when one does occur, until improvements in batteries and battery chemistries completely eliminate such events, additional systems are required that can be used to further minimize the risk to people and property alike. The present invention provides such a system.

SUMMARY OF THE INVENTION

The present invention provides a battery assembly comprised of (i) a plurality of batteries; (ii) a plurality of bus bars positioned proximate to a first end portion of each of the batteries and electrically connected to the first and second terminals of each of the batteries; (iii) a plurality of heat sink segments; and (iv) at least one coolant conduit thermally coupled to the plurality of heat sink segments, where the at least one coolant conduit is electrically isolated from the plurality of heat sink segments. With respect to the plurality of batteries, the first end portion of each of the batteries includes both the first terminal and the second terminal. The batteries are divided into a plurality of battery groups with each battery group comprised of a subset of the plurality of batteries, and with the battery groups being electrically connected in series. The batteries within each subset are electrically connected in parallel such that each subset is maintained at a different voltage than the other battery subsets. With respect to the plurality of heat sink segments, each heat sink segment is electrically isolated from the adjacent heat sink segments. Each of the heat sink segments is thermally coupled to one battery group of the plurality of battery groups such that a second end portion of each battery of each battery group is thermally coupled to one heat sink segment of the plurality of heat sink segments. The second end portion of each battery is distal from the first end portion.

The assembly may be further comprised of a thermally conductive material layer (e.g., an epoxy, a ceramic, etc.) interposed between the second end portion of each battery and the corresponding heat sink segment, where the thermally conductive material layer is electrically insulative. The thermally conductive material layer may be configured to contact and be thermally coupled to the lower portion of each of the batteries. The thermally conductive material layer preferably has a thermal conductivity of at least 0.75 $Wm^{-1}K^{-1}$ and a resistivity of at least $10^{12}$ ohm-cm.

The assembly may be further comprised of an electrically insulative material interposed between each heat sink segment and the adjacent heat sink segments. The electrically insulative material interposed between each heat sink segment and the adjacent heat sink segments preferably has a resistivity of at least $10^{12}$ ohm-cm.

The at least one coolant conduit, which is preferably coupled to a battery pack thermal management system, may be integrated into the heat sink segments via at least one aperture within each heat sink segment, or integrated within slots located on a surface of each heat sink segment.

The at least one coolant conduit may be incorporated into the heat sink segments such that coolant within the conduit(s) flows within a plane that is substantially parallel to an upper surface of a lower battery pack enclosure panel.

In another aspect, each of the batteries may utilize a cylindrical form factor and each of the batteries may be positioned within the battery assembly such that a cylindrical axis corresponding to each of the batteries is substantially perpendicular to a lower battery pack enclosure panel, and such that coolant within the conduit(s) flows within a plane that is substantially perpendicular to the cylindrical axis corresponding to each of the batteries.

The at least one coolant conduit may be comprised of a plastic polymer material (e.g., polyethylene, polypropylene, etc.).

In another aspect, the battery assembly may be further comprised of a layer of a thermal interface material that is interposed between the coolant conduit(s) and each of the heat sink segments, where the thermal interface material is thermally conductive and electrically insulative. The coolant conduit(s) may be comprised of a metal (e.g., aluminum). The layer of thermal interface material that is interposed between the coolant conduit(s) and each of the heat sink segments preferably has a resistivity of at least $10^{12}$ ohm-cm. Preferably the thermal conductivity of the layer of thermal interface material interposed between the coolant conduit(s) and each of the heat sink segments is at least 0.75 $Wm^{-1}K^{-1}$, more preferably at least 5.0 $Wm^{-1}K^{-1}$, and still more preferably at least 20.0 $Wm^{-1}K^{-1}$.

The heat sink segments may be comprised of metal (e.g., aluminum). Preferably the heat sink segments have a thermal conductivity of at least 100 $Wm^{-1}K^{-1}$.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation, and, similarly, a first step could be termed a second step, without departing from the scope of this disclosure.

In the following text, the terms "battery", "cell", and "battery cell" may be used interchangeably and may refer to any of a variety of different battery configurations and chemistries. Typical battery chemistries include, but are not limited to, lithium ion, lithium ion polymer, nickel metal hydride, nickel cadmium, nickel hydrogen, nickel zinc, and silver zinc. The term "battery pack" as used herein refers to an assembly of one or more batteries electrically interconnected to achieve the desired voltage and capacity, where the battery assembly is typically contained within an enclosure. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

Figure 1:
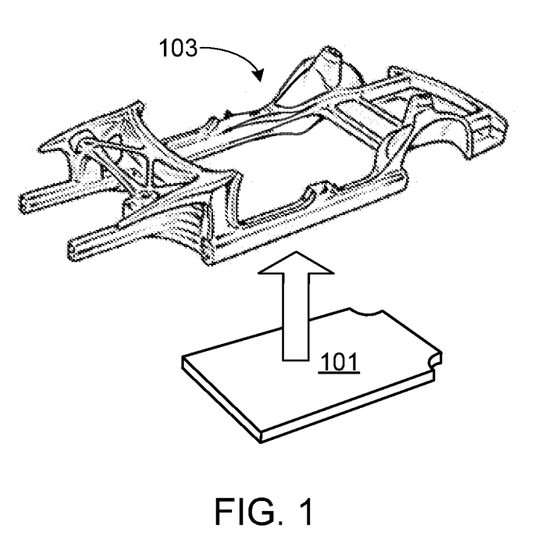
FIG. 1 provides a perspective view of a battery pack and the vehicle chassis to which it is to be mounted.

FIG. 1 provides a perspective view of a battery pack 101 configured to be mounted under vehicle chassis 103. It should be understood that the present invention is not limited to a specific battery pack mounting scheme, battery pack size, or battery pack configuration.

Figure 2:
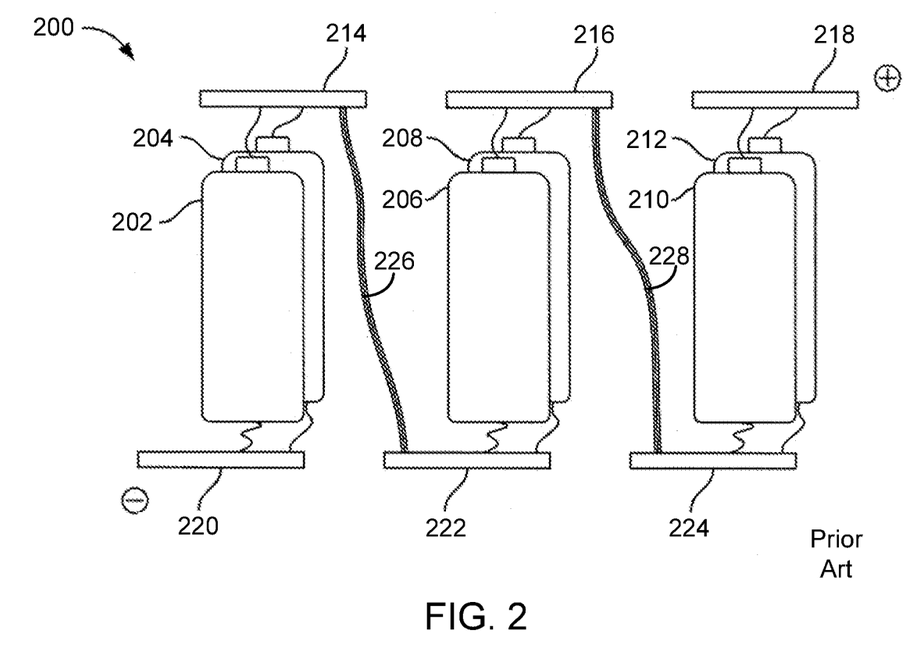
FIG. 2 is a schematic diagram of a battery assembly in accordance with the prior art in which the bus bars are located above and below the batteries.

FIG. 2 illustrates one configuration of a battery assembly 200 that locates bus bars both above and below the batteries. Typically in such a configuration, a cooling conduit (not shown) is positioned between the sides of the batteries, thereby providing a means of regulating battery temperature. Although assembly 200 may be used with any type of battery, in the illustrated assembly batteries 202-212 are cylindrically-shaped, with a nub projecting from the top end of the cell serving as the positive terminal and the can (also referred to as a casing) serving as the negative terminal. Typically a portion of the negative terminal is located at the top end of the cell, for example due to a casing crimp which is formed when the casing is sealed around the contents of the battery. This crimp or other portion of the negative terminal at the top end of the cell provides physical and electrical access at the top end to the negative terminal of the battery. The crimp is spaced apart from the peripheral sides of the projecting nub through a gap that may or may not be filled with an insulator.

In illustrated battery assembly 200, the batteries are divided into a first group of batteries 202 and 204 that are connected in parallel, a second group of batteries 206 and 208 that are connected in parallel, and a third group of batteries 210 and 212 that are connected in parallel. The first, second and third groups of batteries are connected in series. Bus bars 214, 216, 218, 220, 222, 224 are used to connect the batteries in this parallel and series coupling. Each of the bus bars is coupled to the respective batteries with one or more wires. A relatively thick wire 226 couples the second bus bar 214 to the third bus bar 222, making a series connection between the first and second battery groups, while a second relatively thick wire 228 couples the fourth bus bar 216 to the fifth bus bar 224, making a series connection between the second and third battery groups. As a result, the first bus bar 220 is the negative terminal while the sixth bus bar is the positive terminal for battery assembly 200.

The use of bus bars at both ends of the batteries as illustrated in FIG. 2 limits the area where a heat sink can be affixed to either end in order to achieve efficient heat removal. Additionally, soldering or otherwise connecting the relatively thick wire (e.g., wires 226 and 228 in FIG. 2) from an upper bus bar to a lower bus bar adds assembly complexity, and thus cost, to such a battery pack. Wires 226 and 228 can also introduce parasitic resistance into the current path, which in turn can introduce a voltage drop under high current drain conditions. Lastly, wires 226 and 228 are subject to breakage, resulting in short circuits, open circuits, or other reliability problems.

Figure 3:
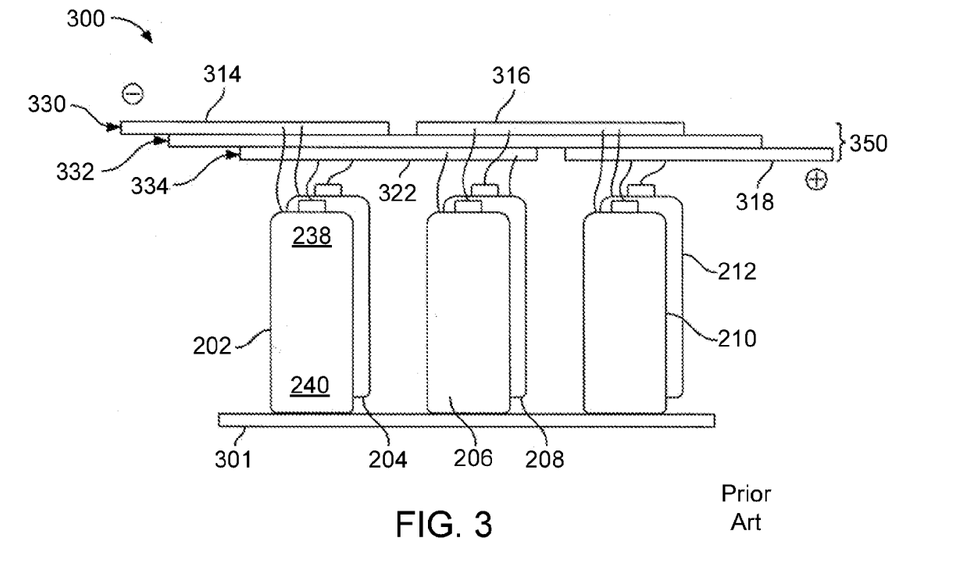
FIG. 3 is a schematic diagram of a battery assembly in accordance with the prior art in which the bus bars are adjacent to the positive terminals of the batteries.

FIG. 3 illustrates a battery assembly 300 utilizing an alternate bus bar configuration in which all of the bus bars are proximate to one end of the battery assembly, thus enabling efficient heat removal from the other end of the battery assembly via heat sink 301. Heat sink 301, which may utilize either air or liquid cooling, is thermally coupled to the bottom end portions 240 of each of the batteries, i.e., batteries 202, 204, 206, 208, 210 and 212.

Access to both the positive and negative terminals in battery assembly 300 is at one end of the cells, e.g., at the top end of the cells, where the bus bars are coupled to the positive and negative terminals using wires. In addition to requiring fewer bus bars than in the configuration of assembly 200, this approach also allows the connecting wires to be significantly shorter, and less resistive, than those required by assembly 200 (e.g., wires 226 and 228 that are used to connect the upper bus bars to the lower bus bars).

As shown in FIG. 3, the first group of batteries 202 and 204 are connected in parallel and are of a first voltage, the second group of batteries 206 and 208 are connected in parallel and are of a second voltage, and the third group of batteries 210 and 212 are connected in parallel and are of a third voltage. The first, second and third groups of batteries are connected in series. Bus bars 314, 316, 318, 322 are used to couple the batteries in this parallel and series arrangement. Specifically, starting with the negative terminal of battery assembly 300, a first bus bar 314 is connected to the negative terminals of the first group of batteries 202 and 204 while a second bus bar 322 is connected to the positive terminals of the same group of batteries 202 and 204, both at the top end portion 238 of each of the batteries. The first and second bus bars 314 and 322 couple the first group of batteries 202 and 204 in parallel. Similarly, the second bus bar 322 and the third bus bar 316 couple the second group of batteries 206 and 208 in parallel, while the third bus bar 316 and the fourth bus bar 318 couple the third group of batteries 210 and 212 in parallel. Series connections between battery groups are formed by the bus bars, specifically the second bus bar 322 connects the positive terminals of the first group of batteries 202 and 204 to the negative terminals of the second group of batteries 206 and 208; and the third bus bar 316 connects the positive terminals of the second group of batteries 206 and 208 to the negative terminals of the third group of batteries 210 and 212. The fourth bus bar 318 is the positive terminal of the battery assembly 300. It should be understood that other bus bar configurations utilizing various combinations of parallel and serial connections may be used without departing from the approach of making all connections to the top portions of each of the batteries.

In battery pack 300, the bus bars are arranged in a layer stack 350, although other configurations, such as those described below, may be used with the invention. In layer stack 350, the first bus bar 314 and the third bus bar 316 are placed in a first layer 330, and are separated by a gap to prevent short circuiting. In some embodiments the gap is filled with an insulator. An insulator is disposed as the second layer 332. The second bus bar 322 and the fourth bus bar 318 are placed in a third layer 334, and are separated by a gap or insulator to prevent short circuiting. The third layer 334 is separated from the first layer 330 by the electrically insulating second layer 332 to prevent short circuiting. It should be understood that layer stack 350 is simply an exemplary stack and that alternate stack configurations are possible. For example, the layer stack may have more than three layers and each bus bar layer may have a single bus bar or two or more bus bars disposed within a single co-planar layer.

The layer stack may be formed using layers of a circuit board. For example, the bus bars can be made of (or on) copper layers or another suitable conductive metal and the insulator can be made of resin impregnated fiberglass or other suitable electrically insulating material. Alternately, the bus bars can be made of aluminum or other electrically conductive material with any of a variety of electrically insulating material applied as an insulating layer.

Figure 4:
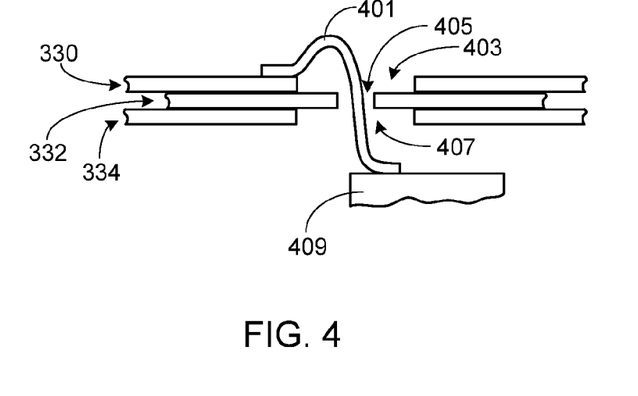
FIG. 4 is a detailed cross-sectional view of the bus bars in a layer stack in a manner similar to that shown in FIG. 3.

It will be appreciated that there are a variety of ways of electrically connecting the battery terminals to the bus bars, and that the present invention is not limited to any particular scheme. An exemplary technique of routing connecting wires between the bus bars and the battery terminals is shown in FIG. 4. As shown, each of the materials in the layer stack has an aperture, and the sizes of the apertures are arranged so that a bond wire 401 is less likely to short out to one of the bus bars. In the exemplary embodiment, a bus bar on the first layer 330 of the layer stack has an aperture 403 through which the bond wire 401 passes. An insulator on the second layer 332 of the layer stack has a smaller aperture 405 through which bond wire 401 passes. A bus bar on the third layer 334 of the layer stack has a larger aperture 407 through which bond wire 401 passes. The smaller aperture 405 of the insulator, i.e., second layer 332, constrains motion of the bond wire 401 so that the bond wire 401 is less likely to contact edges of larger apertures 403 or 407. In other words, the bond wire 401 is less likely to contact the bus bars of the first and third layers as a result of the staggered aperture sizes. Bond wire 401 couples the bus bar on the first layer 330 to a surface 409 of the battery, e.g., a positive or negative terminal at the top of the battery. The apertures within the layers may be circular or any other shape.

Figure 5:
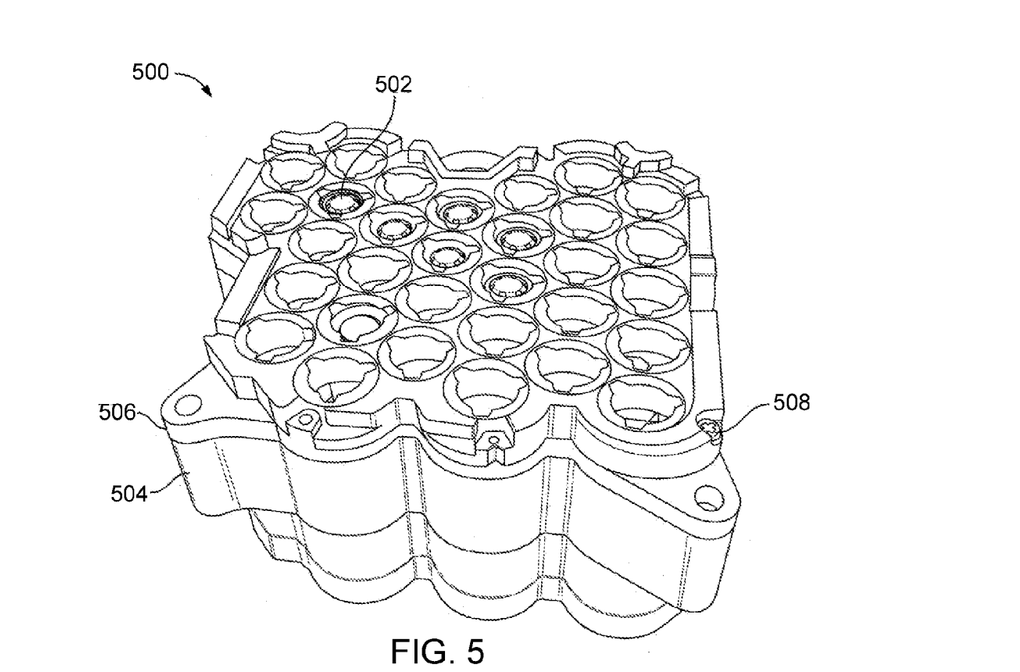
FIG. 5 is a perspective view of a battery holder that may be used with the present invention.

FIG. 5 shows a battery holder 500 that may be used with the present invention, although it should be understood that the present invention is not limited to a specific configuration or form factor for the battery holder. Battery holder 500, which may be molded, cast, printed using a 3D printer, or fabricated using an alternate technique, is preferably fabricated from a plastic (polycarbonate, acrylonitrile butadiene styrene (ABS), polypropylene (PP), polyethylene (PE), polyethylene terephthalate (PET), nylon, etc.), although other materials may also be used to fabricate the holder. The battery holder may be fabricated as a single piece, a two-piece assembly, a three-piece assembly, or other configuration. In the illustrated battery holder, the batteries 502 are inserted into a lower housing member 504, after which the upper housing member 506 is attached, for example using one or more fasteners 508 or other means. The battery holder 500 retains the batteries within the desired battery arrangement, for example in a close-packed or dense-packed, staggered row or hexagonal configuration. Note that the exemplary battery holder shown in FIG. 5 is only partially populated with batteries.

Figure 6:
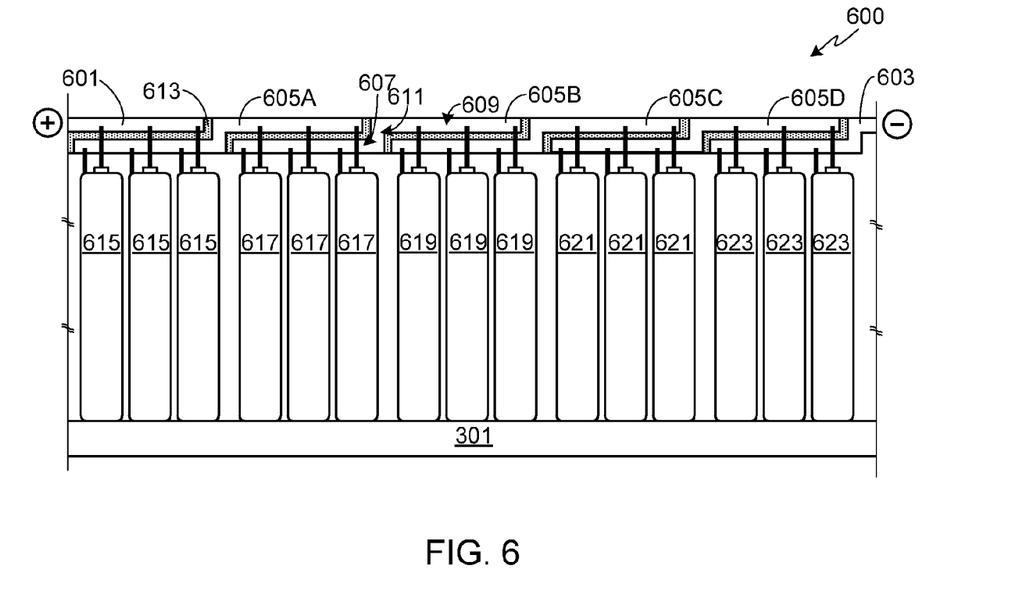
FIG. 6 is a schematic diagram of a battery assembly similar to that shown in FIG. 3, utilizing a different bus bar configuration.

FIG. 6 provides a schematic illustration of an alternate bus bar configuration, similar to that shown in FIG. 3, modified to provide a more compact and robust design. Details regarding this configuration, other than for those provided herein, are disclosed in co-pending and co-assigned U.S. patent application Ser. No. 14/203,874, filed 11 Mar. 2014, the disclosure of which is incorporated herein for any and all purposes.

In the configuration illustrated in FIG. 6, the left-most bus bar 601 represents the positive terminal of the battery pack while the right-most bus bar 603 represents the negative terminal of the battery pack. In between the two output terminals 601 and 603 are a plurality of shaped bus bars (e.g., exemplary bus bars 605A-605D). Each shaped bus bar 605A-605D includes a lower segment 607 and an upper segment 609, where segments 607 and 609 are connected by a step segment 611 fabricated into the bus bar. The stepped feature integrated into each bus bar 605A-605D allows the bus bars to be stacked together, separated by an electrical insulator 613. Electrical insulator 613 may be comprised of a layer of electrically insulating material deposited or otherwise applied to one or more outer bus bar surfaces.

In bus bar configuration 600, batteries 615 are connected in parallel such that each positive terminal of each battery 615 is coupled to output terminal 601 and each negative terminal of each battery 615 is coupled to the lower segment of bus bar 605A. Similarly, batteries 617 are connected in parallel such that each positive terminal of each battery 617 is coupled to the upper segment of bus bar 605A and each negative terminal of each battery 617 is coupled to the lower segment of bus bar 605B; batteries 619 are connected in parallel such that each positive terminal of each battery 619 is coupled to the upper segment of bus bar 605B and each negative terminal of each battery 619 is coupled to the lower segment of bus bar 605C; batteries 621 are connected in parallel such that each positive terminal of each battery 621 is coupled to the upper segment of bus bar 605C and each negative terminal of each battery 621 is coupled to the lower segment of bus bar 605D; and batteries 623 are connected in parallel such that each positive terminal of each battery 623 is coupled to the upper segment of bus bar 605D and each negative terminal of each battery 623 is coupled to the negative output terminal 603. Bus bar 605A serially connects batteries 615 to batteries 617; bus bar 605B serially connects batteries 617 to 619; bus bar 605C serially connects batteries 619 to 621; and bus bar 605D serially connects batteries 621 to 623. It will be appreciated that other battery combinations may be used with this bus bar configuration, for example utilizing more batteries within each parallel connected battery group and/or more groups of batteries within the pack.

As in the embodiment shown in FIG. 3, a heat sink 301 is preferably coupled to the lower end portion of each of the batteries.

In accordance with the invention, in a battery assembly such as that described above (e.g., assembly 600) in which groups of batteries are electrically connected in parallel, and where the individual groups are electrically connected in series, the heat sink that is thermally coupled to the lower end portion of each of the batteries is segmented. As shown in the exemplary embodiment of FIG. 7, the heat sink is segregated into a series of electrically isolated heat sinks 701-705, where all of the batteries that are immediately adjacent to a particular heat sink segment are of the same, or approximately the same, voltage. Preferably heat sink segments 701-705 are fabricated from a thermally conductive metal, such as aluminum, although other thermally conductive materials may be used. The lowermost surface of each battery, and more preferably the lower portion of each battery, is thermally coupled to the heat sink segments 701-705 using a layer 707 of a thermally conductive material, where the selected material preferably has a thermal conductivity of at least 0.75 $Wm^{-1}K^{-1}$ and where the heat sink segments have a thermal conductivity of at least 100 $Wm^{-1}K^{-1}$. In at least one preferred embodiment, layer 707 is fabricated using an epoxy, although the inventors envision the use of other materials as well (e.g., a ceramic). It will be appreciated that heat withdrawal from the batteries is enhanced by thermally coupling the lower portion of each battery to the heat sink segments via layer 707 of the thermally conductive material as shown, rather than simply interposing a layer of such material in the gap 709 between the bottom surface of each battery and the heat sink segments. Preferably gap 709 is on the order of 1 millimeter. Layer 707, which is in contact with multiple batteries as well as the heat sink segments, must be comprised of an electrically non-conductive material, preferably with a resistivity of at least $10^{12}$ ohm-cm, in order to prevent the batteries from shorting to the underlying heat sink segment. Although not required, in at least one configuration of the invention, and as described in detail in co-pending and co-assigned U.S. patent application Ser. No. 14/331,300 the disclosure of which is incorporated herein for any and all purposes, a plurality of electrically non-conductive granules, for example fabricated from alumina or silica, are dispersed within layer 707, and specifically within region 709. As a result of the granules, even if layer 707 softens, the granules help prevent the batteries from contacting the underlying heat sink segment.

Figure 7:
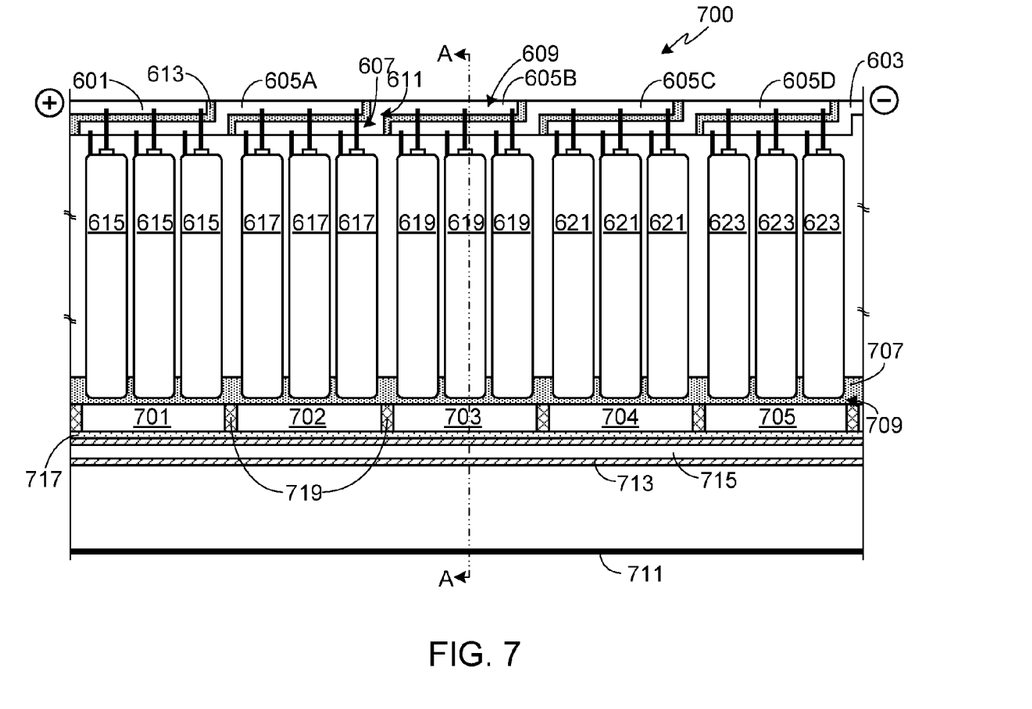
FIG. 7 is a schematic diagram of the battery assembly of FIG. 6, modified to incorporate the heat sink assembly of the invention.

Mounted beneath heat sink segments 701-705, and interposed between the heat sink segments and a battery pack enclosure lower panel 711, is cold plate 713. Preferably cold plate 713 is fabricated from a metal (e.g., aluminum), although other materials with a high thermal conductivity may also be used. Preferably the thermal conductivity of cold plate 713 is at least 100 $Wm^{-1}K^{-1}$. Cold plate 713 is used to transfer heat out of the battery pack, or into the battery pack when battery heating is required. Although cold plate 713 may be air cooled, preferably it is thermally coupled to one or more coolant conduits 715. In the illustrated embodiment, conduit 715 is incorporated into the cold plate. Interposed between the heat sink segments 701-705 and the cold plate 713 is a layer 717 of an electrically insulating, thermally conductive interface material. Layer 717 may be continuous as shown, or segmented, although if it is segmented than preferably the entire lower surface of each heat sink segment (e.g., segments 701-705) is in thermal contact with a thermal layer segment, thus insuring efficient transfer of thermal energy from the batteries, via the heat sink segments, to the cold plate 713. In order to efficiently transfer thermal energy between the heat sink segments and the cold plate, layer (or layers) 717 must have a relatively high thermal conductivity, preferably on the order of at least 0.75 $Wm^{-1}K^{-1}$, more preferably of at least 2.0 $Wm^{-1}K^{-1}$, still more preferably of at least 5.0 $Wm^{-1}K^{-1}$, yet still more preferably of at least 10.0 $Wm^{-1}K^{-1}$, and yet still more preferably of at least 20.0 $Wm^{-1}K^{-1}$. The material comprising layer (or layers) 717 is selected to have a relatively high electrical resistivity, preferably on the order of at least $10^{12}$ ohm-cm, thus electrically isolating the heat sink segments from the underlying cold plate 713. Regions 719, which separate adjacent heat sink segments, are also selected to have a relatively high electrical resistivity, preferably on the order of at least $10^{12}$ ohm-cm, thus electrically isolating adjacent heat sink segments. Note that regions 719 may either be left un-filled, thus allowing air to act as the electrical insulator, or filled with an electrically insulative material.

In the embodiment shown in FIG. 7, heat is transferred from the batteries to the heat transfer liquid (i.e., coolant) within conduits 715 via heat sink segments 701-705, thermal interface material 717, and cold plate 713. The heat is then withdrawn from the battery assembly by the coolant within conduits 715. Note that in the illustrated and preferred embodiment, cooling conduits 715 are aligned with lower panel 711, resulting in the coolant within channels 715 flowing in a direction substantially perpendicular to the axes of the cylindrical batteries. By regulating the flow of coolant within conduits 715 and/or regulating the transfer of heat from the coolant to another temperature control system, the temperature of the batteries may be regulated so that they remain within their preferred operating range.

By segmenting the heat sink, different voltage groups remain electrically isolated from one another even if layer 707 fails and allows the batteries to short to the underlying heat sink segments. For example, in the battery assembly shown in FIG. 7 where batteries 615 are at a first voltage, batteries 617 are at a second voltage, batteries 619 are at a third voltage, batteries 621 are at a fourth voltage, and batteries 623 are at a fifth voltage, these different battery groupings remain electrically isolated even if layer 707 fails and allows battery shorting. As a result, the risk of arcing during a failure of layer 707 is reduced, thereby significantly decreasing the risk of a catastrophic event such as a vehicle fire due to battery arcing. Note that layer 717, which is comprised of an electrically insulative, thermally conductive material as described above, prevents the heat sink segments from shorting to cold plate 713 in the event that layer 707 should fail.

Figure 8:
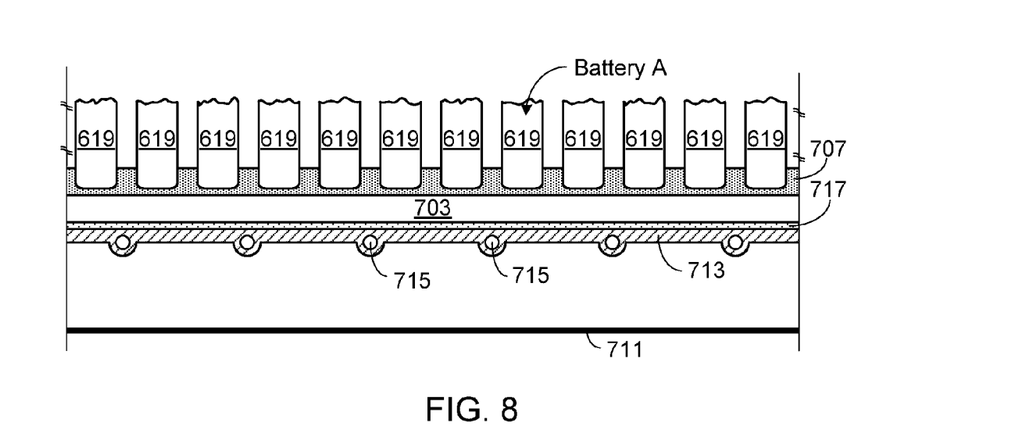
FIG. 8 provides a cross-sectional view of the lower portion of the battery assembly shown in FIG. 7, this view taken along plane A-A of FIG. 7.

FIG. 8 provides a cross-sectional view of a lower portion of battery assembly 700, this view taken along plane A-A shown in FIG. 7. Batteries 619, which all are of the same or approximately the same voltage, are thermally coupled to a single heat sink segment 703 via layer 707. Thermally coupled to heat sink segment 703 is cold plate 713. Interposed between heat sink segment 703 and cold plate 713 is thermal interface layer 717, this layer being thermally conductive and electrically insulating as noted above. Incorporate into cold plate 713 are multiple coolant conduits 715. This configuration achieves multiple goals. First, and as described above in detail, if layer 707 fails and allows some or all of the batteries to short to the underlying heat sink segments, the multi-segmented heat sink approach of the present invention in which heat sink segments are electrically isolated from one another prevents a first battery group at a first voltage from shorting to a second battery group that is at a second, different voltage. Second, by withdrawing heat from the bottom of the batteries using the underlying heat sinks, heat is both transferred between batteries, thereby helping to prevent hot spots, as well as between the batteries and the thermal management system to which conduits 715 are coupled. Thus, for example, if a battery such as "Battery A" of FIG. 8 starts to become hotter than the other batteries within the same group, heat will be transferred to the cooler batteries via heat sink segment 703. Additionally, the heat will be transferred to multiple conduits 715. Note that this is in marked contrast to a battery assembly configuration such as that shown in FIG. 2 in which the cooling conduits are located between adjacent batteries, thereby limiting the transfer of thermal energy between batteries as well as to the thermal management system.

Figure 9:
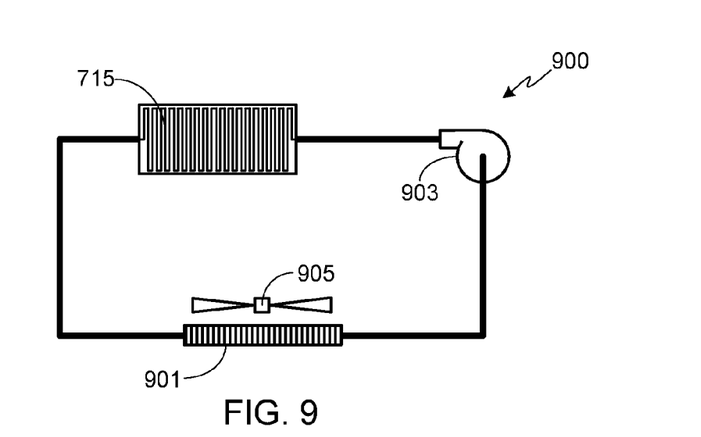
FIG. 9 illustrates an exemplary cooling system suitable for use with a battery assembly such as that of the invention.
Figure 10:
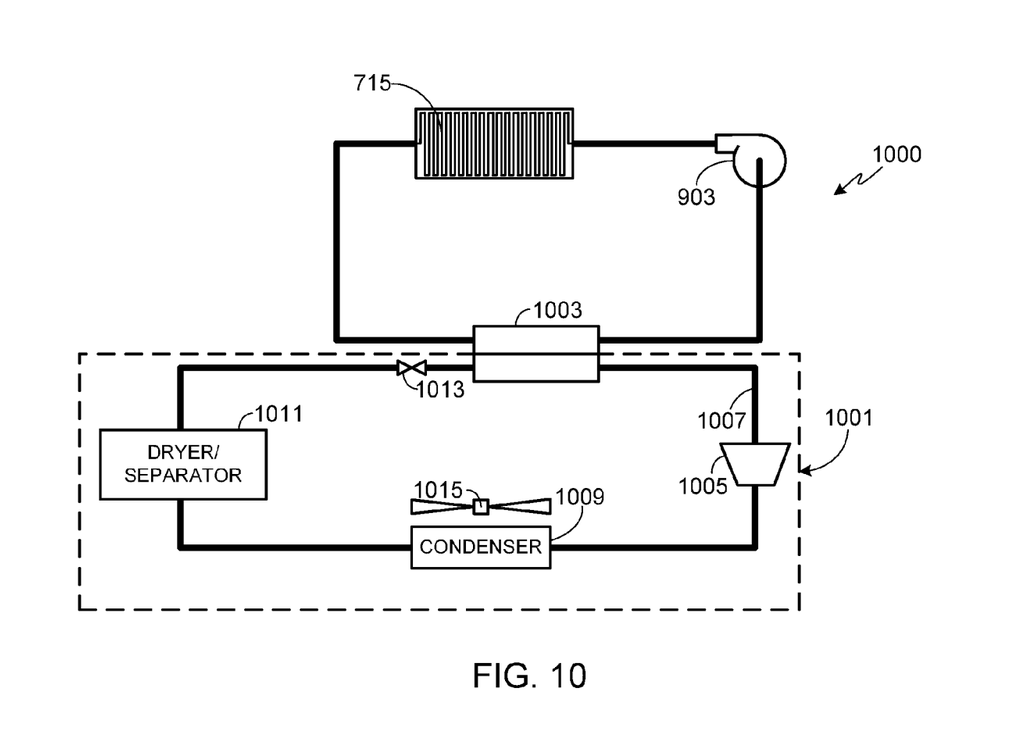
FIG. 10 illustrates an alternate exemplary cooling system suitable for use with a battery assembly such as that of the invention.

FIGS. 9 and 10 illustrate exemplary cooling systems that may be coupled to cooling conduits 715. In system 900 shown in FIG. 9, the coolant within conduits 715 is pumped through a radiator 901 using a pump 903. A blower fan 905 may be used to force air through radiator 901 to insure cooling when the car is stationary. In system 1000 shown in FIG. 10, the coolant within conduits 715 is coupled to a thermal management system 1001 via a heat exchanger 1003. Preferably thermal management system 1001 is a refrigeration system and as such, includes a compressor 1005 to compress the low temperature vapor in refrigerant line 1007 into a high temperature vapor and a condenser 1009 in which a portion of the captured heat is dissipated. After passing through condenser 1009, the refrigerant changes phases from vapor to liquid, the liquid remaining at a temperature below the saturation temperature at the prevailing pressure. The refrigerant then passes through a dryer 1011 that removes moisture from the condensed refrigerant. After dryer 1011, refrigerant line 1007 is coupled to heat exchanger 1003 via thermal expansion valve 1013 which controls the flow rate of refrigerant into heat exchanger 1003. Additionally, in the illustrated system a blower fan 1015 is used in conjunction with condenser 1009 to improve system efficiency. It should be understood that battery pack coolant conduits 715 may be coupled to other cooling/thermal management systems, and the cooling systems shown in FIGS. 9 and 10 are only meant to illustrate some common configurations for use with the conduits of the invention. Additionally, the geometry of cooling conduits 715 shown in FIGS. 9 and 10 is only meant to illustrate one possible configuration.

Figure 11:
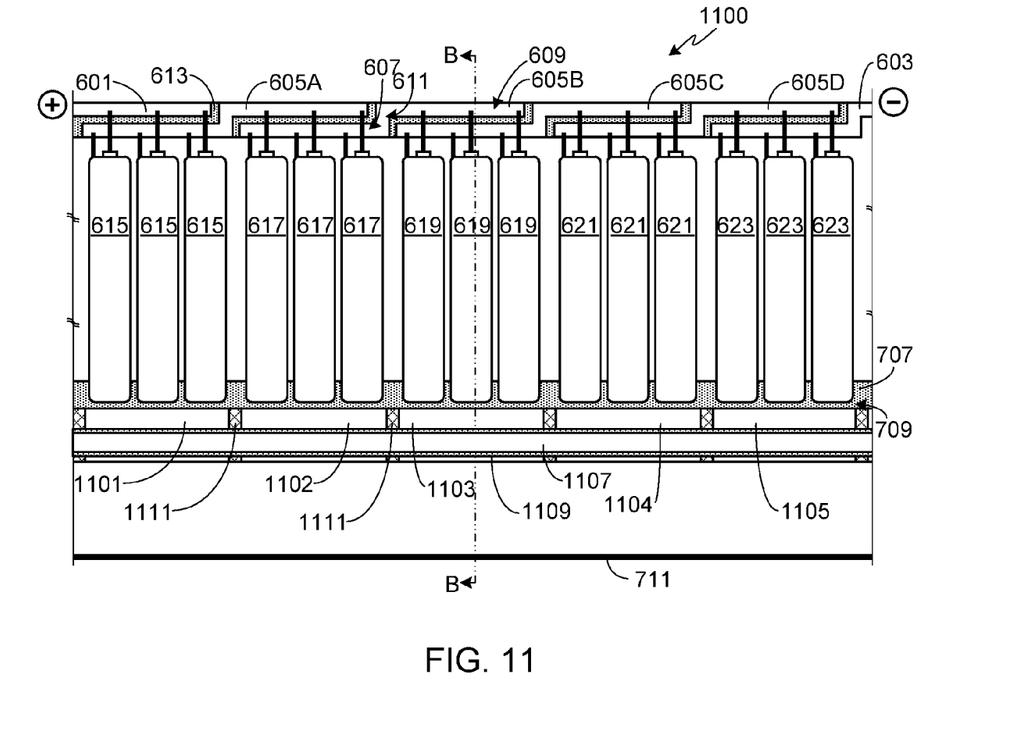
FIG. 11 illustrates an alternate battery assembly to that shown in FIG. 6, this embodiment incorporating the coolant conduit directly into the heat sink segments.
Figure 12:
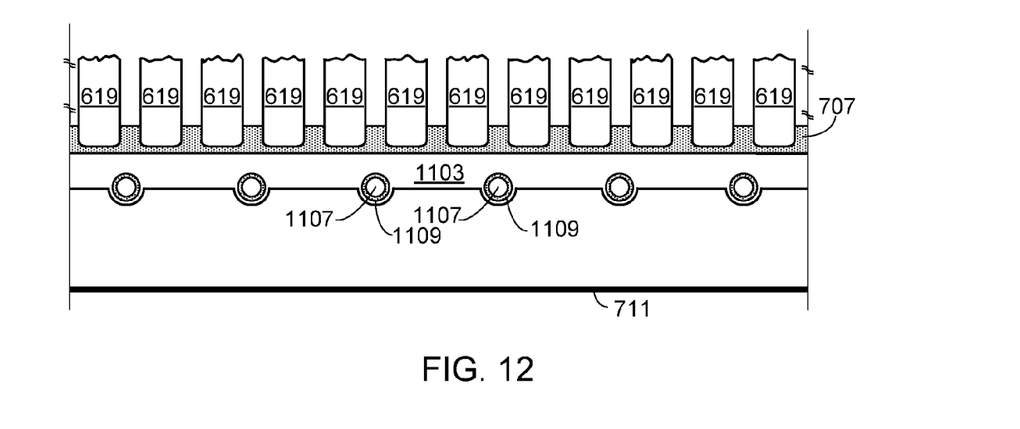
FIG. 12 provides a cross-sectional view of the lower portion of the battery assembly shown in FIG. 11, this view taken along plane B-B of FIG. 11.
Figure 13:
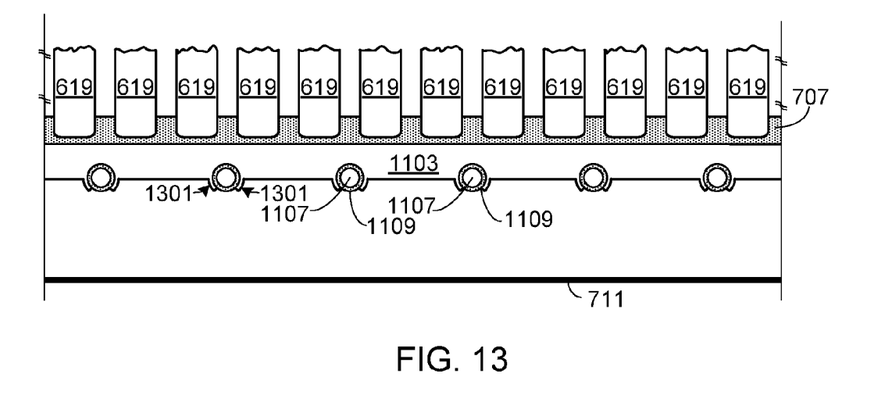
FIG. 13 provides a cross-sectional view, similar to that shown in FIG. 12, of an alternate conduit mounting arrangement.

FIGS. 11-13 provide cross-sectional views, similar to those of FIGS. 7 and 8, of an alternate embodiment of the invention. As in the prior embodiment, the battery assembly includes a plurality of batteries divided into battery groups, where the batteries within each group are electrically connected in parallel and are of the same voltage, where individual battery groups are electrically connected in series, and where each group of batteries is at a different voltage than the other battery groups. Also as in the prior embodiment, the heat sink that is thermally coupled to the lower end portion of each of the batteries is segmented. In assembly 1100, the heat sink is segregated into a series of electrically isolated heat sinks 1101-1105, where all of the batteries that are immediately adjacent to a particular heat sink segment are of the same, or approximately the same, voltage. Heat sink segments 1101-1105 are fabricated from a thermally conductive material, for example a metal such as aluminum, which preferably has a thermal conductivity of at least 100 $Wm^{-1}K^{-1}$. The lowermost surface of each battery, and more preferably the lower portion of each battery, is thermally coupled to the heat sink segments 1101-1105 via a thermally conductive layer 707 (e.g., an epoxy layer), where layer 707 preferably has a thermal conductivity of at least 0.75 $Wm^{-1}K^{-1}$. As in the prior embodiment, layer 707 is comprised of an electrically non-conductive material, preferably with a resistivity of at least $10^{12}$ ohm-cm.

Unlike battery assembly 700 which utilizes a cold plate 713 that is thermally coupled to, but electrically isolated from, the heat sink segments, assembly 1100 utilizes heat sink segments that serve dual purposes; first as a heat sink and heat spreader, and second as a cold plate that transfers heat out of the battery pack or transfers heat into the battery pack when battery heating is required. As such, a conduit 1107 is incorporated into, and passes through, each of the heat sink segments. Although conduit 1107 may be arranged orthogonally from the configuration shown in FIGS. 11 and 12, the illustrated configuration is preferred as it helps to further stabilize battery temperature by efficiently transferring heat between heat sink segments. Interposed between the heat sink segments 1101-1105 and the coolant conduit 1107 is a layer 1109 of an electrically insulating, thermally conductive interface material. Layer 1109 is preferably comprised of a coating applied to the exterior surface of conduit 1107, although in at least one embodiment layer 1109 is comprised of a tube of appropriate material (i.e., an electrically insulating and thermally conductive material) which electrically isolates conduit 1107 from the heat sink segments. Other configurations for layer 1109 are also envisioned (e.g., a coating applied to the interface surface of the heat sink segments). In order to efficiently transfer thermal energy between the heat sink segments and the coolant contained within conduit 1107, layer 1109 must have a relatively high thermal conductivity, preferably on the order of at least 0.75 $Wm^{-1}K^{-1}$, more preferably of at least 2.0 $Wm^{-1}K^{-1}$, still more preferably of at least 5.0 $Wm^{-1}K^{-1}$, yet still more preferably of at least 10.0 $Wm^{-1}K^{-1}$, and yet still more preferably of at least 20.0 $Wm^{-1}K^{-1}$. The material comprising layer 1109 is selected to have a relatively high electrical resistivity, preferably on the order of at least $10^{12}$ ohm-cm, thus electrically isolating the heat sink segments from each other. The material comprising regions 1111, which separate adjacent heat sink segments, is also selected to have a relatively high electrical resistivity, preferably on the order of at least $10^{12}$ ohm-cm, thus electrically isolating adjacent heat sink segments. Note that regions 1111 may either be left un-filled, thus allowing air to act as the electrical insulator, or filled with an electrically insulative material.

Assembly 1100 functions in much the same way as assembly 700. Specifically, heat is transferred from the batteries to the heat transfer liquid (i.e., coolant) within conduits 1107 via heat sink segments 1101-1105 and thermal interface layer 1109. The heat is then withdrawn from the battery assembly by the coolant within conduits 1107. By segmenting the heat sink, different voltage groups remain electrically isolated from one another even if layer 707 fails and the batteries short to the underlying heat sink segments. As a result, the risk of arcing and the ensuing catastrophic event are minimized.

FIG. 12 provides a cross-sectional view of a lower portion of battery assembly 1100, this view taken along plane B-B shown in FIG. 11. This view highlights the incorporation of cooling conduits 1107 within the heat sink segments, specifically heat sink segment 1103 in this view. Batteries 619, which are of the same or approximately the same voltage, are thermally coupled to single heat sink segment 1103 via layer 707. Also visible in this view are the thermal interface layers 1109 that electrically isolate the coolant conduits 1107 from heat sink segment 1103.

FIG. 13 provides a cross-sectional view of battery assembly 1100 in which the heat sink segments have been modified to simplify insertion of the coolant conduits 1107 and the accompanying thermal interface layer 1109 into the heat sink segments. As shown, the bottom portion of the heat sink segment is slotted to accommodate conduits 1107. Fingers 1301 may be sized to allow conduits 1107 and the accompanying thermal interface layer 1109 to 'snap' into the heat sink segments. Alternately, fingers 1301 may be crimped after insertion of the coolant conduit 1107 and the thermal interface layer 1109, the crimping holding the conduits firmly in place in order to insure the efficient transfer of thermal energy between the coolant conduits and the heat sink segments. It will be appreciated that other techniques, such as bonding, may also be used to hold the conduits in place within the slots. Additionally, it should be understood that the use of slots to hold the coolant conduits in place may also be used with the previous embodiment, i.e., the bottom surface of cold plate 713 may be slotted to accommodate coolant conduits 715.

Figure 14:
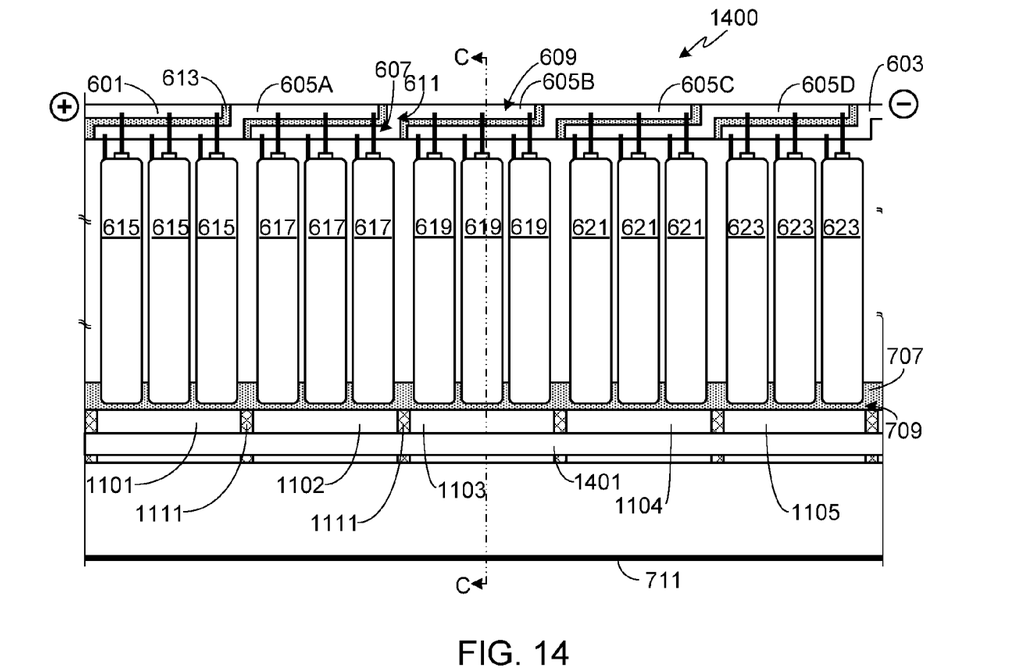
FIG. 14 illustrates an alternate battery assembly to that shown in FIG. 11, this embodiment eliminating the thermal interface between the coolant conduits and the heat sink segments.
Figure 15:
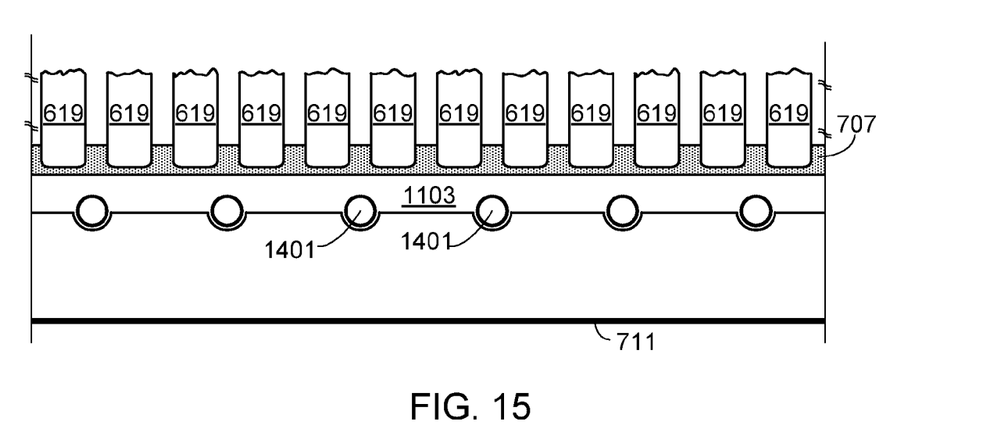
FIG. 15 provides a cross-sectional view of the lower portion of the battery assembly shown in FIG. 14, this view taken along plane C-C of FIG. 14.
Figure 16:
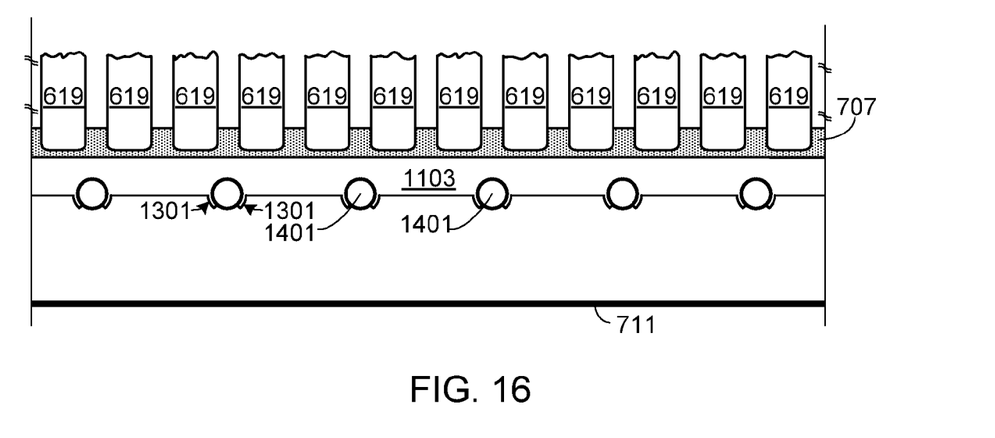
FIG. 16 provides a cross-sectional view, similar to that shown in FIG. 15, of an alternate conduit mounting arrangement.

FIGS. 14-16 provide similar views as those provided by FIGS. 11-13 for a battery assembly that utilizes electrically insulative conduits 1401, thereby eliminating the need for a thermal interface layer (e.g., layer 1109) between the conduits and the heat sink segments. Preferably conduits 1401 have a relatively high thermal conductivity, on the order of at least 0.75 $Wm^{-1}K^{-1}$, more preferably of at least 2.0 $Wm^{-1}K^{-1}$, still more preferably of at least 5.0 $Wm^{-1}K^{-1}$, yet still more preferably of at least 10.0 $Wm^{-1}K^{-1}$, and yet still more preferably of at least 20.0 $Wm^{-1}K^{-1}$. Additionally, the conduits are fabricated from a material with a relatively high electrical resistivity, preferably on the order of at least $10^{12}$ ohm-cm, thus electrically isolating the heat sink segments from one another. In at least one embodiment conduits 1401 are fabricated from a plastic polymer material (e.g., polyethylene, polypropylene, etc.) which, if desired, may be treated to improve thermal conductivity while still retaining its electrically non-conductive properties.

Figure 17:
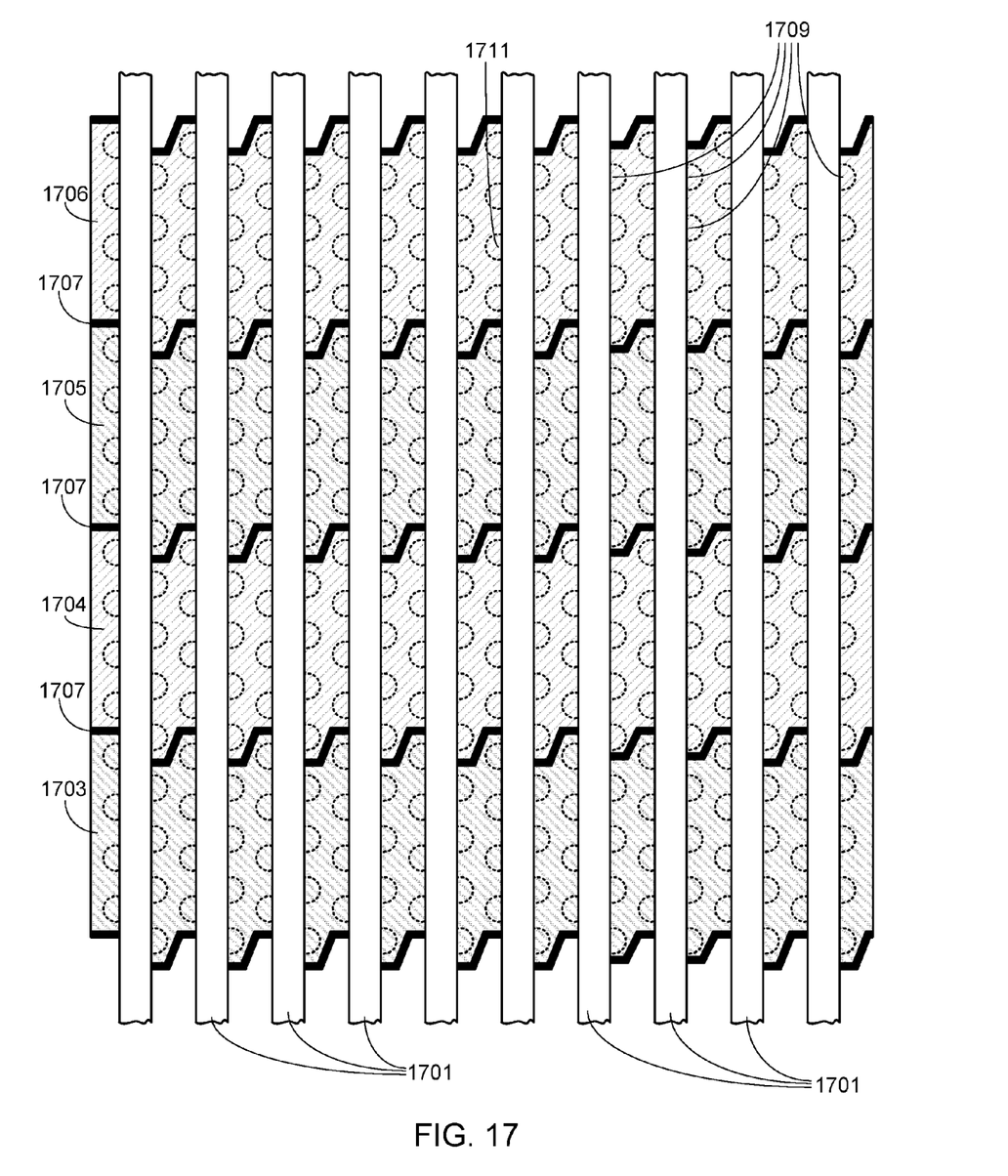
FIG. 17 provides a bottom view of a battery assembly in accordance with the invention, this view illustrating the preferred orientation of the coolant conduits relative to the heat sink segments.

FIG. 17 provides a bottom view of a portion of a battery assembly, such as those shown in the above figures, this view illustrating the preferred orientation of the coolant conduits 1701 relative to the heat sink segments 1703-1706. For clarity, the electrical isolation barrier 1707 is shown between the heat sink segments. Note that batteries 1709 are shown in phantom (i.e., dashed lines). This view illustrates how a battery assembly configured in accordance with the invention spreads heat throughout the assembly, thereby allowing a 'hot' battery (e.g., battery 1711) to transfer its thermal energy to multiple batteries and multiple coolant conduits, rather than relying on the transfer of heat only to an immediately adjacent battery and/or coolant conduit.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:
1. A battery assembly, comprising:
  a plurality of batteries, each battery of said plurality of batteries comprising a first terminal at a first end portion of said battery and a second terminal at said first end portion of said battery, wherein said plurality of batteries are divided into a plurality of battery groups, wherein each battery group of said plurality of battery groups comprises a subset of said plurality of batteries, wherein said batteries within each subset of said plurality of batteries are electrically connected in parallel, wherein said batteries within each subset of said plurality of batteries are maintained at a different voltage than every other subset of said plurality of batteries, and wherein said battery groups of said plurality of battery groups are electrically connected in series; and a plurality of bus bars positioned proximate to said first end portion of each of said plurality of batteries, wherein said plurality of bus bars are electrically connected to said first and second terminals of each battery of said plurality of batteries;

a plurality of heat sink segments, wherein each heat sink segment of said plurality of heat sink segments is electrically isolated from adjacent heat sink segments, wherein each heat sink segment of said plurality of heat sink segments is thermally coupled to one battery group of said plurality of battery groups such that a second end portion of each battery of each battery group is thermally coupled to one heat sink segment of said plurality of heat sink segments, and wherein said second end portion of each battery of said plurality of batteries is distal from said first end portion of each battery of said plurality of batteries;

a thermally conductive material layer interposed between said second end portion of each battery of each battery group and a corresponding heat sink segment of said plurality of heat sink segments, wherein said thermally conductive material layer is electrically insulative, and wherein said thermally conductive material layer is in direct contact with said second end portion of each battery of each battery group and said corresponding heat sink segment of said plurality of heat sink segments;

at least one coolant conduit thermally coupled to said plurality of heat sink segments, wherein said at least one coolant conduit is electrically isolated from said plurality of heat sink segments.

2. The battery assembly of claim 1, wherein said thermally conductive material layer has a thermal conductivity of at least 0.75 $Wm^{-1}K^{-1}$ and a resistivity of at least $10^{12}$ ohm-cm.

3. The battery assembly of claim 1, wherein said thermally conductive material layer is comprised of a material selected from the group consisting of epoxies and ceramics.

4. The battery assembly of claim 1, wherein said at least one coolant conduit is coupled to a battery pack thermal management system.

5. The battery assembly of claim 1, wherein each heat sink segment of said plurality of heat sink segments further comprises at least one aperture, wherein said at least one conduit passes through said at least one aperture of each heat sink segment of said plurality of heat sink segments.

6. The battery assembly of claim 1, wherein a surface of each heat sink segment of said plurality of heat sink segments is slotted to accommodate said at least one coolant conduit.

7. The battery assembly of claim 1, wherein said at least one coolant conduit is incorporated into said plurality of heat sink segments such that coolant within said at least one coolant conduit flows within a plane that is substantially parallel to an upper surface of a lower battery pack enclosure panel.

8. The battery assembly of claim 1, wherein each of said plurality of batteries utilizes a cylindrical form factor, wherein said plurality of batteries are positioned within said battery assembly such that a cylindrical axis corresponding to each of said plurality of batteries is substantially perpendicular to a lower battery pack enclosure panel, and wherein said at least one coolant conduit is incorporated into said plurality of heat sink segments such that coolant within said at least one coolant conduit flows within a plane that is substantially perpendicular to said cylindrical axis corresponding to each of said plurality of batteries.

9. The battery assembly of claim 1, wherein said at least one coolant conduit is comprised of a plastic polymer material.

10. The battery assembly of claim 9, wherein said plastic polymer material is selected from the group consisting of polyethylene and polypropylene.

11. The battery assembly of claim 1, further comprising a layer of a thermal interface material interposed between said at least one coolant conduit and each of said plurality of heat sink segments, wherein said thermal interface material is thermally conductive and electrically insulative.

12. The battery assembly of claim 11, wherein said layer of said thermal interface material has a thermal conductivity of at least 0.75 $Wm^{-1}K^{-1}$ and a resistivity of at least $10^{12}$ ohm-cm.

13. The battery assembly of claim 12, wherein said thermal conductivity of said layer of said thermal interface material is at least 5.0 $Wm^{-1}K^{-1}$.

14. The battery assembly of claim 13, wherein said thermal conductivity of said layer of said thermal interface material is at least 20.0 $Wm^{-1}K^{-1}$.

15. The battery assembly of claim 11, wherein said at least one coolant conduit is comprised of a metal.

16. The battery assembly of claim 15, wherein said at least one coolant conduit is comprised of aluminum.

17. The battery assembly of claim 1, wherein each heat sink segment of said plurality of heat sink segments is comprised of a metal.

18. The battery assembly of claim 17, wherein each heat sink segment of said plurality of heat sink segments is comprised of aluminum.

19. The battery assembly of claim 1, wherein each heat sink segment of said plurality of heat sink segments has a thermal conductivity of at least 100 $Wm^{-1}K^{-1}$.

* * * * *